United States Patent
Ayuzawa et al.

(10) Patent No.: US 10,167,019 B2
(45) Date of Patent: Jan. 1, 2019

(54) AUTOMOBILE VEHICLE BODY AND AUTOMOBILE VEHICLE BODY MANUFACTURING METHOD

(71) Applicant: HONDA MOTOR CO., LTD., Minato-Ku, Tokyo (JP)

(72) Inventors: Shotaro Ayuzawa, Wako (JP); Takahira Kawata, Wako (JP); Minoru Sakamoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/505,743

(22) PCT Filed: Jun. 5, 2015

(86) PCT No.: PCT/JP2015/066322
§ 371 (c)(1),
(2) Date: Feb. 22, 2017

(87) PCT Pub. No.: WO2016/031337
PCT Pub. Date: Mar. 3, 2016

(65) Prior Publication Data
US 2017/0267290 A1    Sep. 21, 2017

(30) Foreign Application Priority Data

Aug. 26, 2014 (JP) ................. 2014-171581

(51) Int. Cl.
*B62D 21/15* (2006.01)
*B62D 25/06* (2006.01)
(Continued)

(52) U.S. Cl.
CPC ......... *B62D 21/157* (2013.01); *B62D 25/025* (2013.01); *B62D 25/04* (2013.01);
(Continued)

(58) Field of Classification Search
CPC .. B62D 21/157; B62D 27/065; B62D 27/026; B62D 27/023; B62D 65/02;
(Continued)

(56) References Cited

U.S. PATENT DOCUMENTS

| 9,045,164 B2 | 6/2015 | Matsuda | |
| 2014/0028053 A1* | 1/2014 | Hihara | B62D 25/20 296/187.12 |
| 2014/0239546 A1* | 8/2014 | Santoni | B62D 29/046 264/265 |

FOREIGN PATENT DOCUMENTS

| JP | 2014-000860 A | 1/2014 |
| WO | 2013/080340 A1 | 6/2013 |

* cited by examiner

*Primary Examiner* — Joseph D. Pape
*Assistant Examiner* — Dana D Ivey
(74) *Attorney, Agent, or Firm* — Carrier Blackman & Associates, P.C.; Joseph P. Carrier; Anne G. Sabourin

(57) ABSTRACT

An automobile vehicle body and an automobile vehicle body manufacturing method is provided in which a metal joint is divided into an upper joint and a lower joint. The upper joint includes an upper wall which is fitted into a side member, a vehicle width direction inner wall and a vehicle width direction outer wall, and a lower joint includes a lower wall which is joined to a lower face and an outside face of a vehicle body floor, and the vehicle width direction outer wall, and therefore, the vehicle width direction outer wall of the upper joint is fastened to the vehicle width direction outer wall of the lower joint by a first bolt, and the vehicle width direction inner wall of the upper joint is fastened to an inside face of the side member by a second bolt.

10 Claims, 10 Drawing Sheets

(51) Int. Cl.
  *B62D 29/04* (2006.01)
  *B62D 29/00* (2006.01)
  *F16F 7/12* (2006.01)
  *B62D 27/06* (2006.01)
  *B62D 25/20* (2006.01)
  *B62D 25/08* (2006.01)
  *B62D 25/02* (2006.01)
  *B62D 65/02* (2006.01)
  *B62D 25/04* (2006.01)
  *B62D 27/02* (2006.01)

(52) U.S. Cl.
  CPC .............. *B62D 25/06* (2013.01); *B62D 25/08* (2013.01); *B62D 25/2009* (2013.01); *B62D 27/023* (2013.01); *B62D 27/026* (2013.01); *B62D 27/065* (2013.01); *B62D 29/001* (2013.01); *B62D 29/005* (2013.01); *B62D 29/04* (2013.01); *B62D 29/043* (2013.01); *B62D 29/048* (2013.01); *B62D 65/02* (2013.01); *F16F 7/121* (2013.01); *F16F 2224/0208* (2013.01)

(58) Field of Classification Search
  CPC .. B62D 25/025; B62D 25/08; B62D 25/2009; B62D 25/06; B62D 25/04; B62D 29/001; B62D 29/04; B62D 29/005; B62D 29/043; B62D 29/048; F16F 7/121; F16F 2224/0208
  USPC .................................................... 296/187.12
  See application file for complete search history.

AUTOMOBILE VEHICLE BODY AND AUTOMOBILE VEHICLE BODY MANUFACTURING METHOD

TECHNICAL FIELD

The present invention relates to an automobile vehicle body in which a lower skeleton, formed into a bathtub shape using a CFRP, includes a vehicle body floor, a front wall that rises from a front end of the vehicle body floor, a rear wall that rises from a rear end of the vehicle body floor, and a pair of side members that are connected to upper faces of vehicle width direction opposite side parts of the vehicle body floor, and an upper skeleton, connected to the lower skeleton, includes a roll bar formed into an inverted U-shaped using a CFRP and having a lower end thereof joined to an upper face of the side member via a metal joint, and a method for manufacturing the automobile vehicle body.

BACKGROUND ART

An automobile vehicle body in which one side of a linking member formed into an L-shape using a metal material such as aluminum is fixed, by means of a bolt, to an upper face of a rocker (side sill) at the vehicle width direction outer end of a floor made of an FRP, the other side is fitted into the interior of a center pillar made of an FRP and is fixed by means of a bolt and, furthermore, the other side of the linking member and a lower face of the rocker are connected using a tension member, which is an elastic member such as a rubber, an energy-absorbing member being sandwiched between the tension member and the vehicle width direction outer end of the rocker is known from Patent Document 1 below.

RELATED ART DOCUMENTS

Patent Documents

Patent Document 1: International Patent Application Laid-open No. WO2013/080340

SUMMARY OF THE INVENTION

Problems to be Solved by the Invention

However, the arrangement described in Patent Document 1 above has the problem that, since the tension member, which is an elastic member, makes little contribution to the strength with which the rocker and the center pillar are joined, and the rocker and the center pillar are linked substantially by only the L-shaped linking member, the strength of the linking part is insufficient. Moreover, when the center pillar is attached to and detached from the rocker, since it is necessary to carry out attachment or detachment of both the linking member and the tension member, there is the problem that the workability is degraded. Furthermore, since the rocker and the floor are formed integrally, even if the cross section of the floor is made larger than that of the rocker to thus increase the vehicle body strength, the FRP continuous fibers bend between the floor and the rocker and are easily broken, and because of this it is necessary to use a large-sized mold, thus causing problems such as high equipment cost and low productivity. The present invention has been accomplished in light of the above circumstances, and it is an object thereof to enhance the productivity while preventing continuous fibers from bending by forming, within a CFRP lower skeleton, a floor and a side member (rocker) from separate members, and also to enhance the ease of assembly of components that are to be fitted to each of an upper skeleton and the lower skeleton by enabling the upper skeleton and lower skeleton to be separated, and to strongly and easily detachably join the lower end of a CFRP roll bar to an upper face of the side member via a metal joint.

Means for Solving the Problems

In order to attain the above object, according to a first aspect of the present invention, there is provided an automobile vehicle body in which a lower skeleton, formed into a bathtub shape using a CFRP, comprises a vehicle body floor, a front wall that rises from a front end of the vehicle body floor, a rear wall that rises from a rear end of the vehicle body floor, and a pair of side members that are connected to upper faces of vehicle width direction opposite side parts of the vehicle body floor, and an upper skeleton, connected to the lower skeleton, comprises a roll bar formed into an inverted U-shaped using a CFRP and having a lower end thereof joined to an upper face of the side member via a metal joint, wherein the metal joint is divided into an upper joint that is fixed to the side member and supports the lower end of the roll bar and a lower joint that is fixed to the vehicle body floor, the upper joint comprises an upper wall, a vehicle width direction inner wall and a vehicle width direction outer wall that are fitted to an upper face, an inside face, and an outside face of the side member respectively, the lower joint comprises a lower wall and a vehicle width direction outer wall that are joined to a lower face and a vehicle width direction outer face of the vehicle body floor respectively, the vehicle width direction outer wall of the upper joint and the vehicle width direction outer wall of the lower joint are fastened by a first bolt, and the vehicle width direction inner wall of the upper joint and the inside face of the side member are fastened by a second bolt.

Further, according to a second aspect of the present invention, in addition to the first aspect, the upper joint is further divided into an inside and an outside in the vehicle width direction and supports the lower end of the roll bar so as to sandwich the lower end from the inside and the outside in the vehicle width direction.

Furthermore, according to a third aspect of the present invention, in addition to the first or second aspect, the metal joint is a casting and comprises a reinforcing rib that extends in a vertical direction.

Moreover, according to a fourth aspect of the present invention, in addition to any one of the first to third aspects, the roll bar is formed so as to have a closed hollow cross-section by connecting an inner CFRP laminate that forms a lower face and a vehicle width direction inner face and an outer CFRP laminate that forms an upper face and a vehicle width direction outer face by a plurality of metal plates.

Further, according to a fifth aspect of the present invention, in addition to any one of the first to fourth aspects, the automobile vehicle body comprises an energy-absorbing member at a position above the metal joint of the vehicle width direction outer face of the roll bar.

Furthermore, according to a sixth aspect of the present invention, in addition to any one of the first to fifth aspects, the vehicle body floor, the front wall, and the rear wall comprise a sandwich structure in which a core is sandwiched between an outer skin and an inner skin, and the side member connected to the vehicle body floor, the front wall and the rear wall is formed into a U-shape as seen in a side view while integrally comprising a side sill, a front pillar lower and a rear pillar.

Moreover, according to a seventh aspect of the present invention, in addition to the sixth aspect, the upper skeleton is formed by connecting a pair of left and right bent parts of the roll bar, which is bent into an inverted U-shape, to respective intermediate parts in a fore-and-aft direction of a pair of left and right roof side rails, which are formed from an aluminum alloy hollow member, by bolting a front end of the roof side rail and an upper end of the front pillar lower together, and by bolting the rear end of the roof side rail and an upper end of the rear pillar together.

Further, according to an eighth aspect of the present invention, in addition to the seventh aspect, the roll bar is fitted into a recess portion formed in the roof side rail, and the roll bar is sandwiched between the recess portion and a fixing member fixed to the roof side rail.

Furthermore, according to a ninth aspect of the present invention, in addition to the seventh or eighth aspect, a front metal joint provided at the front end of the roof side rail is fastened to the upper end of the front pillar lower by a front bolt and a rear bolt, and a distance between the front bolt and the rear bolt is larger than a width in a fore-and-aft direction of the upper end of the front pillar lower.

Moreover, according to a tenth aspect of the present invention, in addition to the seventh or eighth aspect, a rear metal joint provided at the rear end of the roof side rail is fastened to the upper end of the rear pillar by a front bolt and a rear bolt, and a distance between the front bolt and the rear bolt is larger than a width in a fore-and-aft direction of the upper end of the rear pillar.

Further, according to an eleventh aspect of the present invention, in addition to any one of the first to tenth aspects, there is provided a method for manufacturing the automobile vehicle body, comprising a step of forming a subcomponent by bolting together the upper skeleton and the side member, a step of adhering the side member of the subcomponent to the vehicle body floor, a step of separating the upper skeleton by undoing the bolting together, a step of assembling a component to the upper skeleton and the lower skeleton including the side member, which have been separated, and a step of re-bolting together the upper skeleton and the lower skeleton including the side member, to which the component has been assembled.

Effects of the Invention

In accordance with the first aspect of the present invention, the metal joint that joins the lower end of the roll bar of the upper skeleton formed into an inverted U-shape using a CFRP to the upper face of the side member of the CFRP lower skeleton is divided into the upper joint, which is fixed to the side member and supports the lower end of the roll bar, and the lower joint, which is fixed to the vehicle body floor. Since the upper joint includes the upper wall, the vehicle width direction inner wall, and the vehicle width direction outer wall, which that are fitted to the upper face, the inside face, and the outside face of the side member respectively, the lower joint includes the lower wall and the vehicle width direction outer wall, which are joined to the lower face and the outside face of the vehicle body floor respectively, the vehicle width direction outer wall of the upper joint and the vehicle width direction outer wall of the lower joint are fastened by the first bolt, and the vehicle width direction inner wall of the upper joint and the inside face of the side member are fastened by the second bolt, not only is it possible to strongly join the roll bar to the vehicle body floor and the side member, but it is also possible to easily attach the roll bar to and detach it from the side member.

Moreover, not only is it possible, by forming the vehicle body floor and the side member as separate bodies, to obtain a high-strength CFRP vehicle body structure having an increased cross section for the side member, but it is also possible to easily carry out positioning of the side member and the vehicle body floor by fastening the upper outer joint and the upper inner joint to the lower joint, and to ensure that there is working space for mounting a component that is to be fitted on the upper skeleton and the lower skeleton by releasing the fastening between the upper joint and the lower joint, thereby enhancing the productivity.

Furthermore, in accordance with the second aspect of the present invention, since the upper joint is further divided into the inside and the outside in the vehicle width direction and support the lower end of the roll bar while sandwiching it from the inside and the outside in the vehicle width direction, even if there is a variation in the thickness in the vehicle width direction of the lower end of the roll bar, it is possible, by adjusting the gap between the divided upper joints, to absorb the variation.

Moreover, in accordance with the third aspect of the present invention, since the metal joint is a casting and includes the reinforcing rib, which extends in the vertical direction, it is possible to enhance the strength of the metal joint.

Furthermore, in accordance with the fourth aspect of the present invention, since the roll bar is formed so as to have a closed hollow cross-section by connecting the inner CFRP laminate, which forms a lower face and a vehicle width direction inner face, and the outer CFRP laminate, which forms an upper face and a vehicle width direction outer face, by the plurality of metal plates, when the collision load of a side collision is inputted, carbon fibers of the inner CFRP laminate and the outer CFRP laminate each support the tensile load and the compressive load to thus enhance the bending stiffness of the roll bar, and the metal plate undergoes plastic deformation owing to its ductility to thus enable the collision energy to be absorbed.

Moreover, in accordance with the fifth aspect of the present invention, since the energy-absorbing member is at a position, above the metal joint, on the vehicle width direction outer face of the roll bar, when the collision load of a side collision is inputted the energy-absorbing member crumples, thus enabling the collision energy to be absorbed at early stage.

Furthermore, in accordance with the sixth aspect of the present invention, since the vehicle body floor, the front wall, and the rear wall form a sandwich structure in which the core is sandwiched between the outer skin and the inner skin, and the side member connected to the vehicle body floor, front wall, and rear wall is formed into a U-shape when viewed from the side while integrally including the side sill, the front pillar lower, and the rear pillar, it is possible to obtain a light-weight and high-strength lower skeleton by ensuring the longest length for the CFRP carbon continuous fibers.

Moreover, in accordance with the seventh aspect of the present invention, since the upper skeleton is formed by connecting the pair of left and right bent parts of the roll bar, which is bent into an inverted U-shape, to respective intermediate parts in the fore-and-aft direction of the pair of left and right roof side rails, which are formed from an aluminum alloy hollow member, by bolting the front end of the roof side rail and the upper end of the front pillar lower together, and by bolting the rear end of the roof side rail and the upper end of the rear pillar together, it becomes easy to attach the upper skeleton, formed from the roll bar and the roof side rail, to the lower skeleton and detach it therefrom, thus enhancing the productivity.

Furthermore, in accordance with the eighth aspect of the present invention, since the roll bar is fitted into the recess portion formed in the roof side rail, and the roll bar is sandwiched between the recess portion and the fixing member fixed to the roof side rail, it is possible to make the axis center of the roll bar be close to the axis center of the roof side rail, thus enhancing the rigidity of the upper skeleton.

Moreover, in accordance with the ninth aspect of the present invention, since the front metal joint provided at the front end of the roof side rail is fastened to the upper end of the front pillar lower by the front bolt and the rear bolt, and the distance between the front bolt and the rear bolt is larger than the width in the fore-and-aft direction of the upper end of the front pillar lower, it is possible to strongly support the bending moment acting on the roof side rail by the front metal joint, thereby enhancing the bending stiffness of the roof side rail.

Furthermore, in accordance with the tenth aspect of the present invention, since the rear metal joint provided at the rear end of the roof side rail is fastened to the upper end of the rear pillar by the front bolt and the rear bolt, and the distance between the front bolt and the rear bolt is larger than the width in the fore-and-aft direction of the upper end of the rear pillar, it is possible to strongly support the bending moment acting on the roof side rail by the rear metal joint, thus enhancing the bending stiffness of the roof side rail.

Moreover, in accordance with the eleventh aspect of the present invention, since the subcomponent is formed by bolting together the upper skeleton and the side member, the side member is adhered to the vehicle body floor, the front wall, and the rear wall, the upper skeleton and the lower skeleton are separated by undoing the bolting together, a component is assembled to the upper skeleton and the lower skeleton, which have been separated, and the upper skeleton and the lower skeleton, to which a component has been assembled, are re-joined by bolting together, the lower skeleton does not interfere when a component is assembled to the upper skeleton, and the upper skeleton does not interfere when a component is assembled to the lower skeleton, thus not only improving the productivity, but also enabling joining and separation of the upper skeleton and the lower skeleton to be easily carried out due to them being bolted together.

EXPLANATION OF REFERENCE NUMERALS AND SYMBOLS

Figure 1:
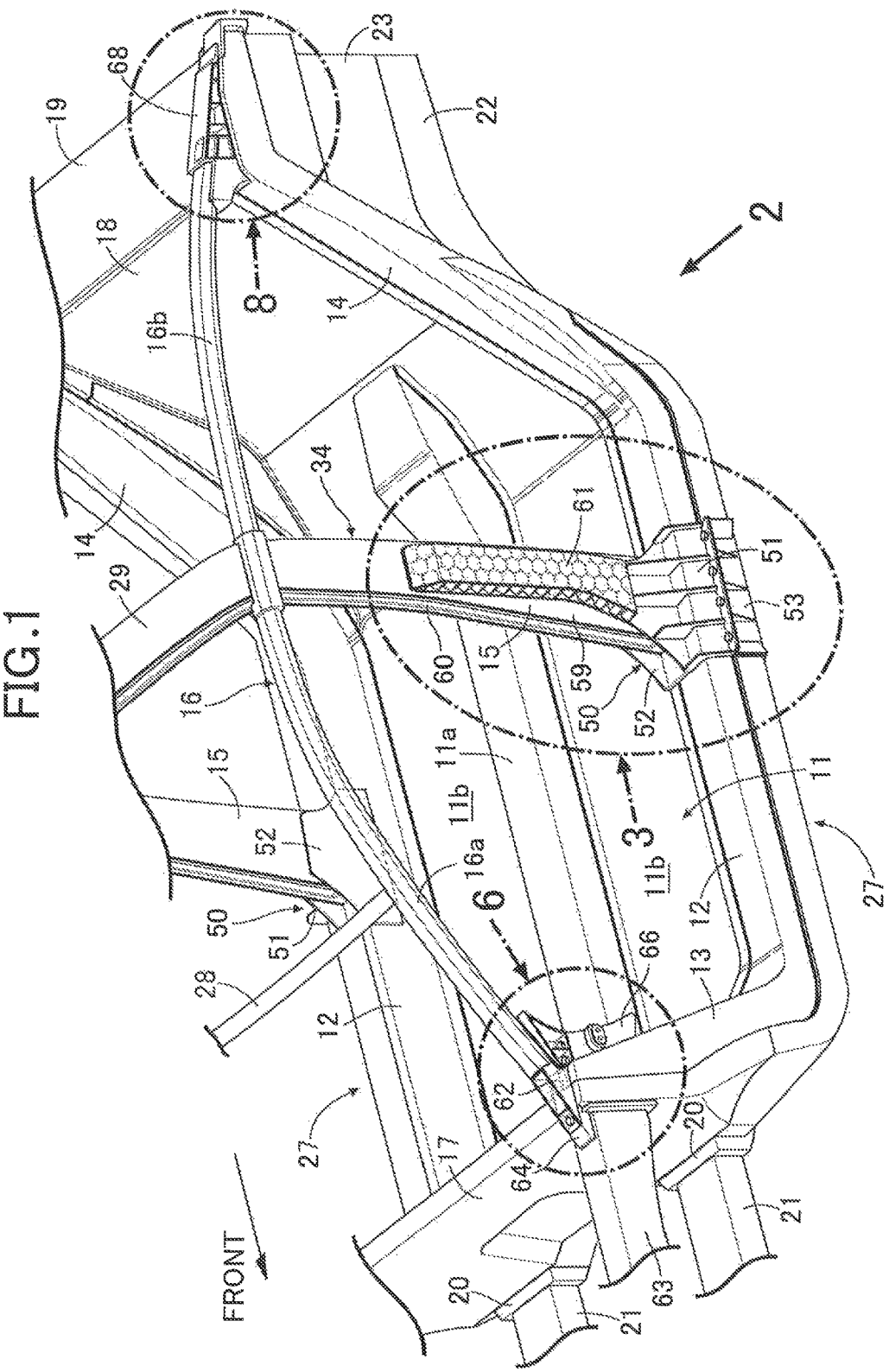
FIG. 1 is a perspective view of an automobile vehicle body frame viewed obliquely from the front.

11 Vehicle body floor
12 Side sill
13 Front pillar lower
14 Rear pillar
16 Roof side rail
16c Recess portion
17 Dash panel lower
18 Rear partition wall (Rear wall)
25 Outer skin
26 Inner skin
27 Side member
33 Core
34 Roll bar
37 Fixing member
46 Outer side face
47 Upper face
49 Inner side face
50 Metal joint
51 Upper outer joint (Upper joint)
51b Upper wall
51c Lower vehicle width direction outer wall (Vehicle width direction outer wall)
51e Reinforcing rib
52 Upper inner joint (Upper joint)
52b Upper wall
52c Lower vehicle width direction inner wall (Vehicle width direction inner wall)
53 Lower joint
53a Lower wall
53b Vehicle width direction outer wall
53d Reinforcing rib
54 First bolt
56 Second bolt
58 Inner CFRP laminate
59 Outer CFRP laminate
60 Metal plate
61 Energy-absorbing member
62 Front metal joint
65 Front bolt
67 Rear bolt
68 Rear metal joint
69 Front bolt
70 Rear bolt
73 Upper skeleton
74 Lower skeleton
75 Subcomponent

MODE FOR CARRYING OUT THE INVENTION

An embodiment of the present invention is explained below by reference to FIG. 1 to FIG. 10. In the present specification, the fore-and-aft direction, the left-and-right direction (vehicle width direction), and the vertical direction are defined with respect to an occupant seated on a driving seat.

First Embodiment

Figure 2:
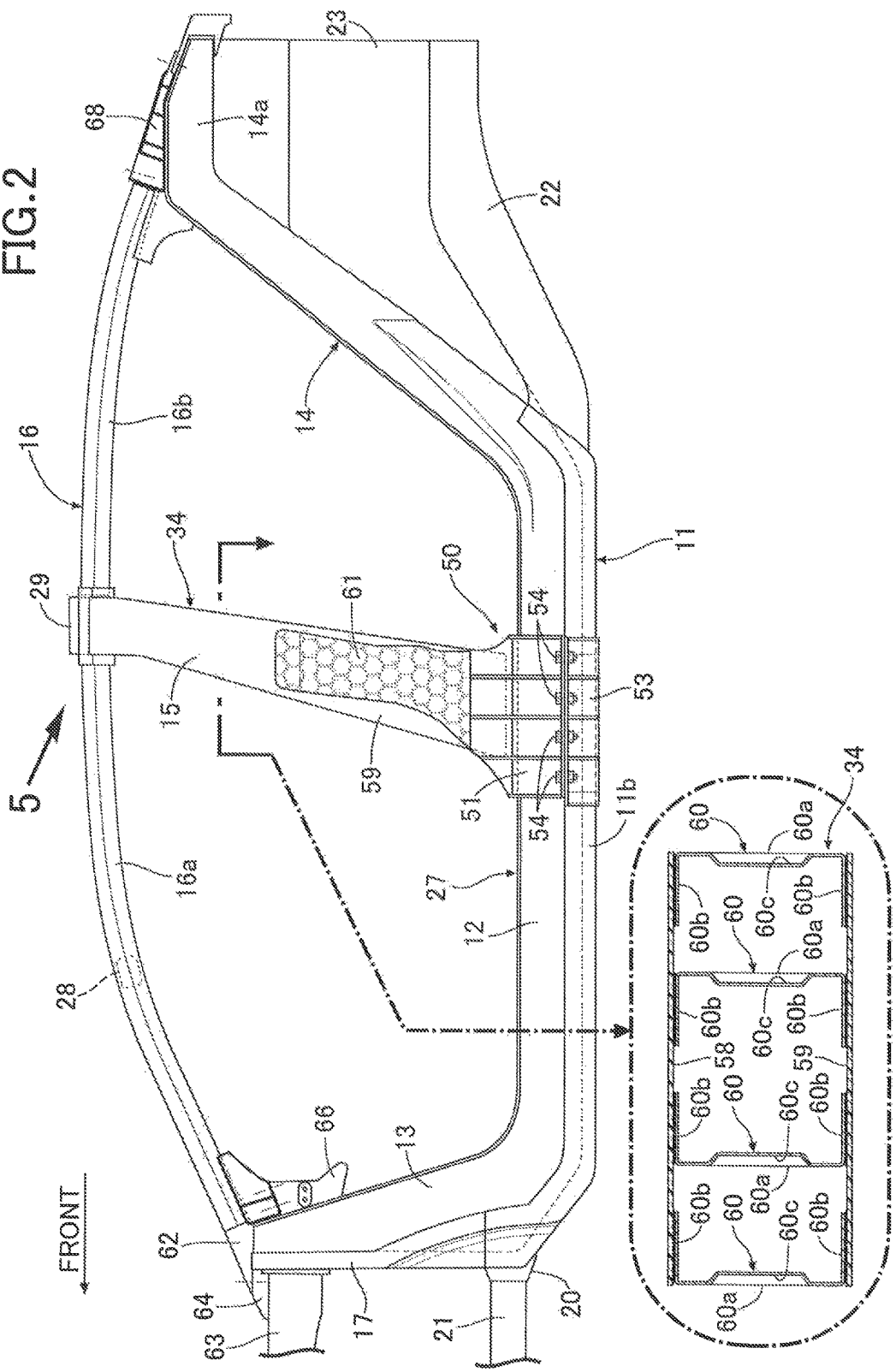
FIG. 2 is a view in the direction of arrow 2 in FIG. 1.

First, as shown in FIG. 1 and FIG. 2, an automobile vehicle body frame with a CFRP (carbon fiber-reinforced plastic) as a main material includes a vehicle body floor 11, a pair of left and right side sills 12 and 12 extending in the fore-and-aft direction along left and right side parts of the vehicle body floor 11, a pair of left and right front pillar lowers 13 and 13 rising upward to the front from front ends of the left and right side sills 12 and 12, a pair of left and right rear pillars 14 and 14 rising upward to the rear from rear ends of the left and right side sills 12 and 12, a pair of left and right center pillars 15 and 15 rising upward from intermediate parts in the fore-and-aft direction of the left and right side sills 12 and 12, and a pair of left and right roof side rails 16 and 16, made of an aluminum alloy pipe material, extending from upper ends of the left and right front pillar lowers 13 and 13 to upper ends of the left and right rear pillars 14 and 14 via upper ends of the left and right center pillars 15 and 15. The side sill 12, the front pillar lower 13, and the rear pillar 14 are formed as a unit and form a side member 27.

The left and right roof side rails 16 and 16 are connected by means of a front roof arch 28 and a middle roof arch 29. The upper ends of the left and right center pillars 15 and 15 and the opposite ends in the vehicle width direction of the middle roof arch 29 are integrally continuous, forming an inverted U-shaped roll bar 34 when viewed from the front. The roof side rail 16 is divided into a front member 16a and a rear member 16b with the roll bar 34 as a border, and a front half of the front member 16a forms a front pillar upper. The integrated left and right roof side rails 16 and 16, roll bar 34 and front roof arch 28 form an upper skeleton 73.

A flat plate-shaped dash panel lower 17 is joined to the front end of the vehicle body floor 11 and front faces of the left and right front pillar lowers 13 and 13, a flat plate-shaped rear partition wall 18 is joined to the rear end of the vehicle body floor 11 and rear faces of the left and right rear pillars 14 and 14, and a rear parcel shelf 19 extends horizontally to the rear from the rear end of the rear partition wall 18. The integrated vehicle body floor 11, dash panel lower 17, rear partition wall 18, and left and right side members 27 and 27 form a lower skeleton 74. A pair of left and right mounting pedestals 20 and 20, made of an aluminum alloy casting, are fixed to the front end of the vehicle body floor 11, and rear ends of a pair of left and right front side frames 21 and 21, made of an aluminum alloy casting, are fixed to front ends of the mounting pedestals 20 and 20.

A pair of left and right rear side frames 22 and 22 extend rearward from the rear end of a lower wall of the vehicle body floor 11, and the rear pillars 14 and 14 and the rear side frames 22 and 22 are joined by means of a pair of left and right rear wheel house inners 23 and 23.

Figure 4:
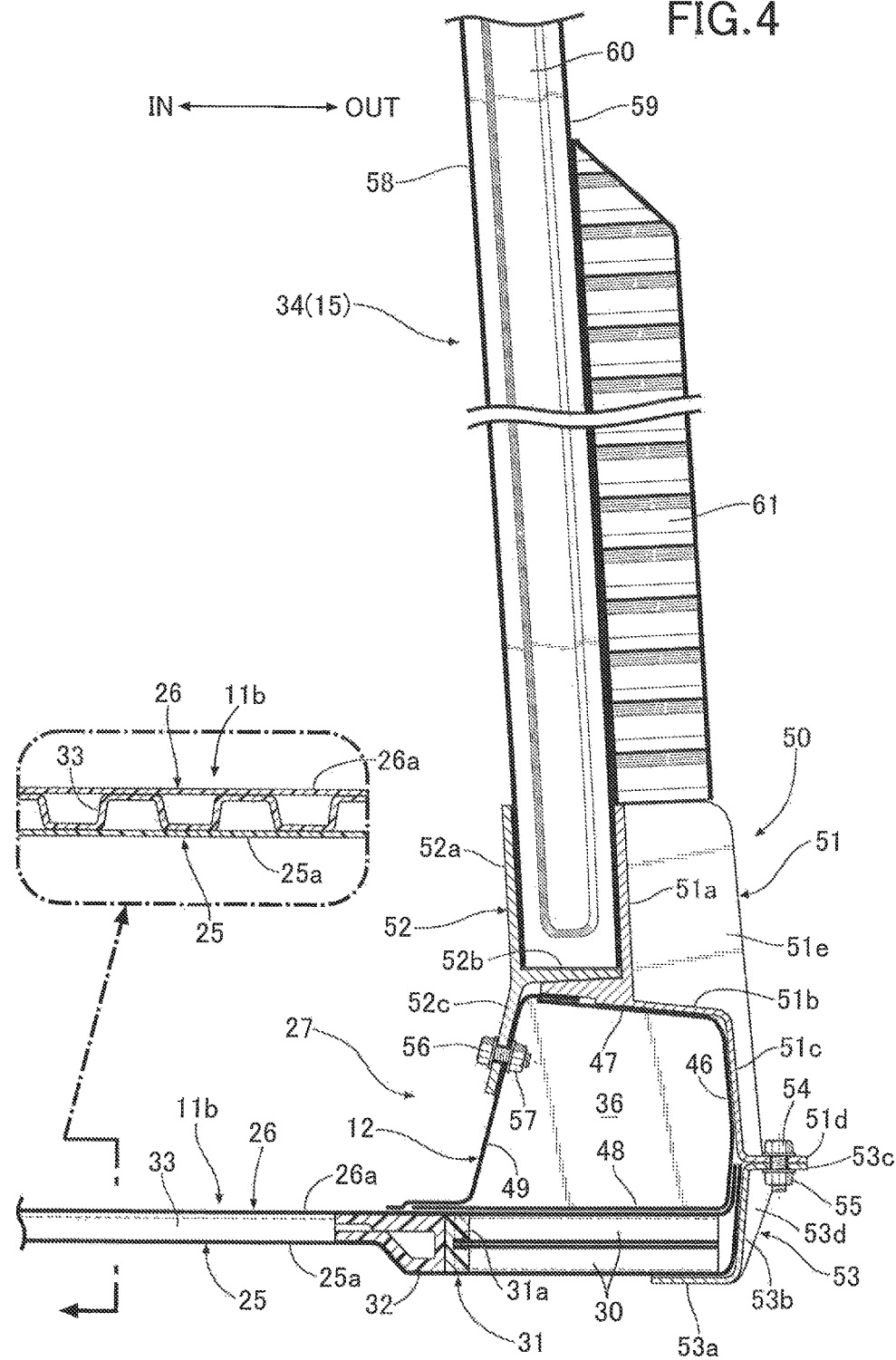
FIG. 4 is a sectional view along line 4-4 in FIG. 3.

As shown in FIG. 1 and FIG. 4, the vehicle body floor 11 includes an inverted U-shaped floor tunnel portion 11a that extends in the fore-and-aft direction in a middle part in the vehicle width direction and a pair of left and right floor portions 11b and 11b that are continuous with opposite sides in the vehicle width direction of the floor tunnel portion 11a. With regard to the floor portion 11b, which includes a floor part lower wall 25a of an outer skin 25 and a floor part upper wall 26a of an inner skin 26, opposite end parts in the vehicle width direction are thicker in the vertical direction compared with a middle part in the vehicle width direction, and a pair of upper and lower energy-absorbing members 30 and 30 are disposed on these thick portions. The energy-absorbing members 30 and 30 are formed from a corrugated member made of a PA (polyamide) or a nylon having excellent impact absorption performance.

A support wall 31 is fixed by adhesion to vehicle width direction inner sides of the energy-absorbing members 30 and 30, and the energy-absorbing members 30 and 30 are fitted into and joined by adhesion to a fitting groove 31a formed in a vehicle width direction outer face of the support wall 31. An upper face of the energy-absorbing members 30 and 30 is joined by adhesion to a lower face of the inner skin 26, and a lower face of the energy-absorbing members 30 and 30 is joined by adhesion to an upper face of the outer skin 25.

A load-dispersing frame 32, made of a CFRP (or made of an aluminum alloy), extending in the fore-and-aft direction is disposed in a portion that is inside the support wall 31 in the vehicle width direction and where the thickness of the floor portion 11b changes. An upper face and a lower face of the load-dispersing frame 32 are joined by adhesion to the lower face of the inner skin 26 and the upper face of the outer skin 25 respectively, and a vehicle width direction outer face is joined by adhesion to a vehicle width direction inner face of the support wall 31. A corrugated core 33 is disposed in the interior of the floor portion 11b on the inside of the load-dispersing frame 32 in the vehicle width direction, and an upper face and a lower face of the corrugated core 33 are joined by adhesion to the lower face of the inner skin 26 and the upper face of the outer skin 25 respectively.

The side member 27, which is formed from the side sill 12, the front pillar lower 13, and the rear pillar 14, is formed into a square closed cross-section while including an outer side face 46, an upper face 47, a lower face 48, and an inner side face 49, and a plurality of partition wall plates 36 are disposed in the interior of the side sill 12 at predetermined intervals in the fore-and-aft direction. The lower face 48 of the side sill 12 is placed on and joined by adhesion to an upper face of the inner skin 26 in a vehicle width direction outer end part of the vehicle body floor 11, that is, an upper part of the energy-absorbing members 30 and 30.

Figure 3:
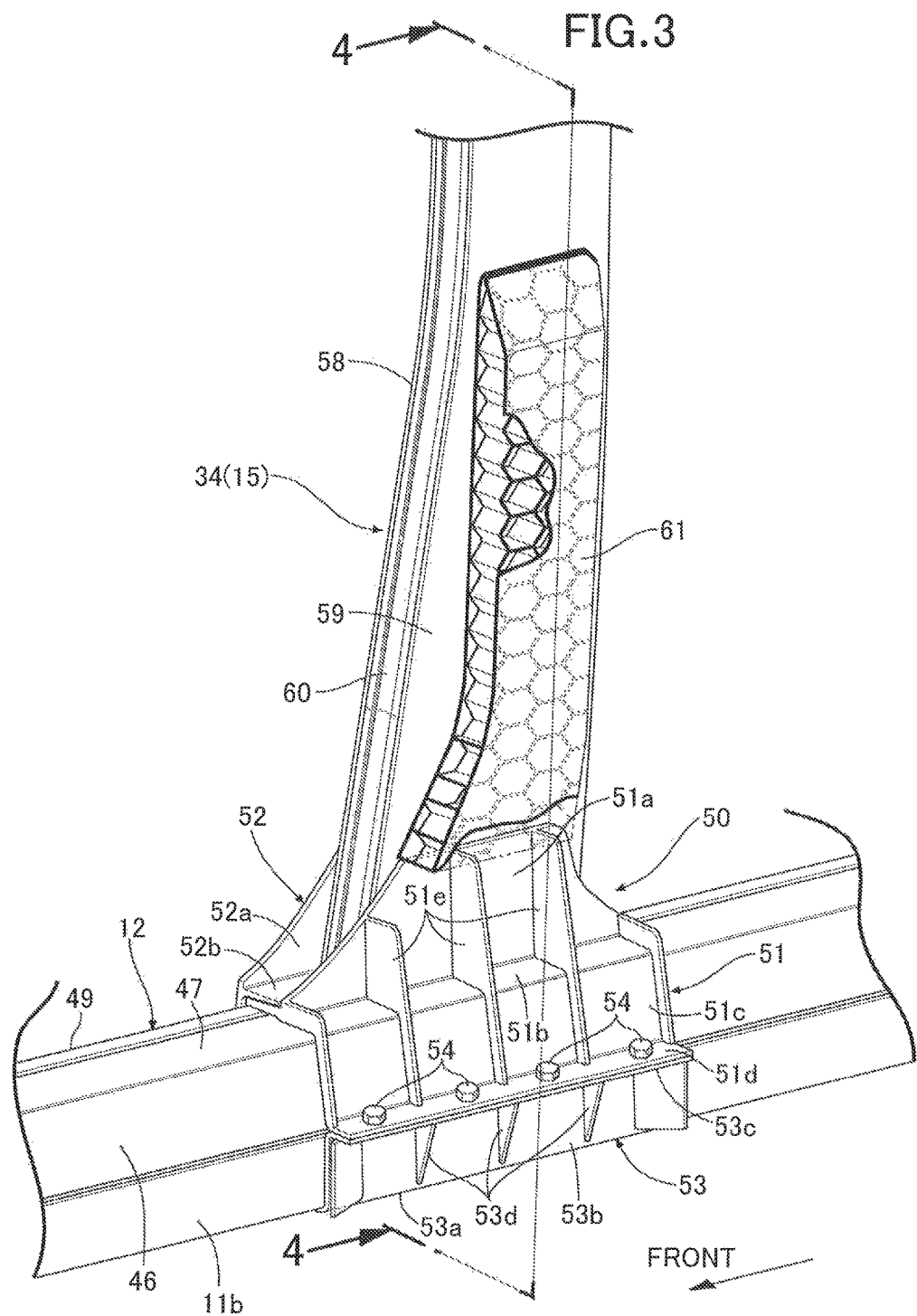
FIG. 3 is an enlarged view of part 3 in FIG. 1.

As shown in FIG. 2 to FIG. 4, a lower end part of the roll bar 34 (lower end part of the center pillar 15) is supported on an intermediate part in the fore-and-aft direction of the side sill 12 of the side member 27 via a metal joint 50, made of an aluminum alloy casting. The metal joint 50 is formed from an upper outer joint 51, an upper inner joint 52, and a lower joint 53.

The upper outer joint 51 includes an upper vehicle width direction outer wall 51a that abuts against a vehicle width direction outer face of the center pillar 15, an upper wall 51b that is connected to the lower end of the upper vehicle width direction outer wall 51a and abuts against the upper face 47 of the side sill 12, a lower vehicle width direction outer wall 51c that is connected to the vehicle width direction outer end of the upper wall 51b and abuts against the outside face 46 of the side sill 12, a flange portion 51d that extends from the lower end of the lower vehicle width direction outer wall 51c toward the outside in the vehicle width direction, and a plurality of reinforcing ribs 51e that connect the upper vehicle width direction outer wall 51a, the upper wall 51b, and the lower vehicle width direction outer wall 51c.

The upper inner joint 52 includes an upper vehicle width direction inner wall 52a that abuts against a vehicle width direction inner face of the center pillar 15, an upper wall 52b that is connected to the lower end of the upper vehicle width direction inner wall 52a and abuts against an upper face of the upper wall 51b of the upper outer joint 51, and a lower vehicle width direction inner wall 52c that is connected to the lower end of the upper vehicle width direction inner wall 52a and abuts against the inside face 49 of the side sill 12.

The lower joint 53 includes a lower wall 53a that abuts against a lower face of the floor portion 11b, a vehicle width direction outer wall 53b that extends upward from the vehicle width direction outer end of the lower wall 53a, a flange portion 53c that extends from the upper end of the vehicle width direction outer wall 53b toward the outside in the vehicle width direction, and a plurality of reinforcing ribs 53d that connect the vehicle width direction outer wall 53b and the flange portion 53c.

The upper outer joint 51 and the upper inner joint 52 are integrally fixed to the center pillar 15 by adhering the upper walls 51b and 52b thereof to each other, adhering the upper vehicle width direction outer wall 51a of the upper outer joint 51 to the vehicle width direction outer face of the center pillar 15, and adhering the upper vehicle width direction inner wall 52a of the upper inner joint 52 to the vehicle width direction inner face of the center pillar 15. Furthermore, the lower joint 53 is fixed integrally to the floor portion 11b by adhering the lower wall 53a and the vehicle width direction outer wall 53b to the lower face and the vehicle width direction outer face of the floor portion 11b respectively.

Accordingly, the flange portion 51d of the upper outer joint 51 and the flange portion 53c of the lower joint 53 are fastened to each other by means of first bolts 54 and nuts 55, and the lower vehicle width direction inner wall 52c of the upper inner joint 52 is fastened to the inside face 49 of the side sill 12 by means of second bolts 56 and nuts 57, thereby detachably joining the lower end of the center pillar 15 to the side sill 12. In this arrangement, adjusting the vehicle width direction gap between the upper outer joint 51 and the upper inner joint 52 enables variations in the vehicle width direction thickness of the center pillar 15 to be absorbed.

The roll bar 34 is formed from an inner CFRP laminate 58 forming a vehicle width direction inner face and a lower face, an outer CFRP laminate 59 forming a vehicle width direction outer face and an upper face, and four metal plates 60, made of an aluminum alloy, connecting the inner and outer CFRP laminates 58 and 59. The metal plate 60 includes joining flanges 60b and 60b formed by bending vehicle width direction opposite end parts of a main body portion 60a, which is orthogonal to the inner and outer CFRP laminates 58 and 59, and adhering the joining flanges 60b of the four metal plates 60 to mutually opposing faces of the two CFRP laminates 58 and 59 forms a rectangular closed cross-section that is short in the vehicle width direction and long in the fore-and-aft direction. A bead 60c extending in the vertical direction is formed on the main body portion 60a of the metal plate 60.

Adhered to a vehicle width direction outer face of a lower part of the center pillar 15 of the roll bar 34 is an energy-absorbing member 61 formed into a honeycomb shape using an aluminum alloy. The axis of the honeycomb of the energy-absorbing member 61 is oriented in the vehicle width direction, and the energy-absorbing member 61 crumples due to the collision load of a side collision, thus absorbing the collision energy.

Figure 5:
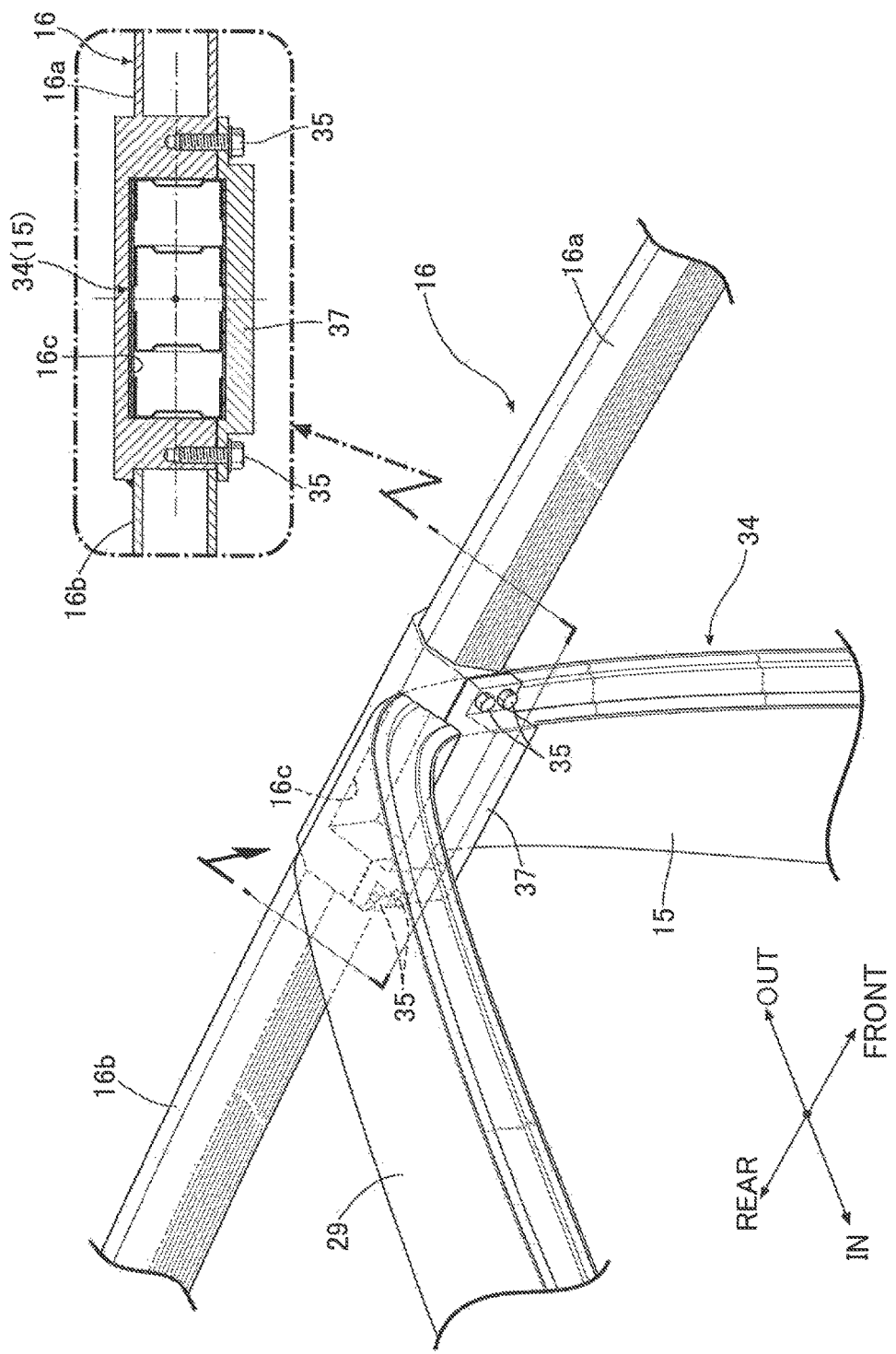
FIG. 5 is a view in the direction of arrow 5 in FIG. 2.

As shown in FIG. 5, a rectangular recess portion 16c is formed in a vehicle width direction inner face of a rear end part of the front member 16a of the roof side rail 16, and the roll bar 34 is fitted into the recess portion 16c and fixed by sandwiching it between the recess portion 16c and a fixing member 37 fastened to the front member 16a by means of bolts 35. Owing to this structure, it is possible to make the axis of the roll bar 34 and the axis of the roof side rail 16 be close to each other, thus enhancing the joining strength.

Figure 6:
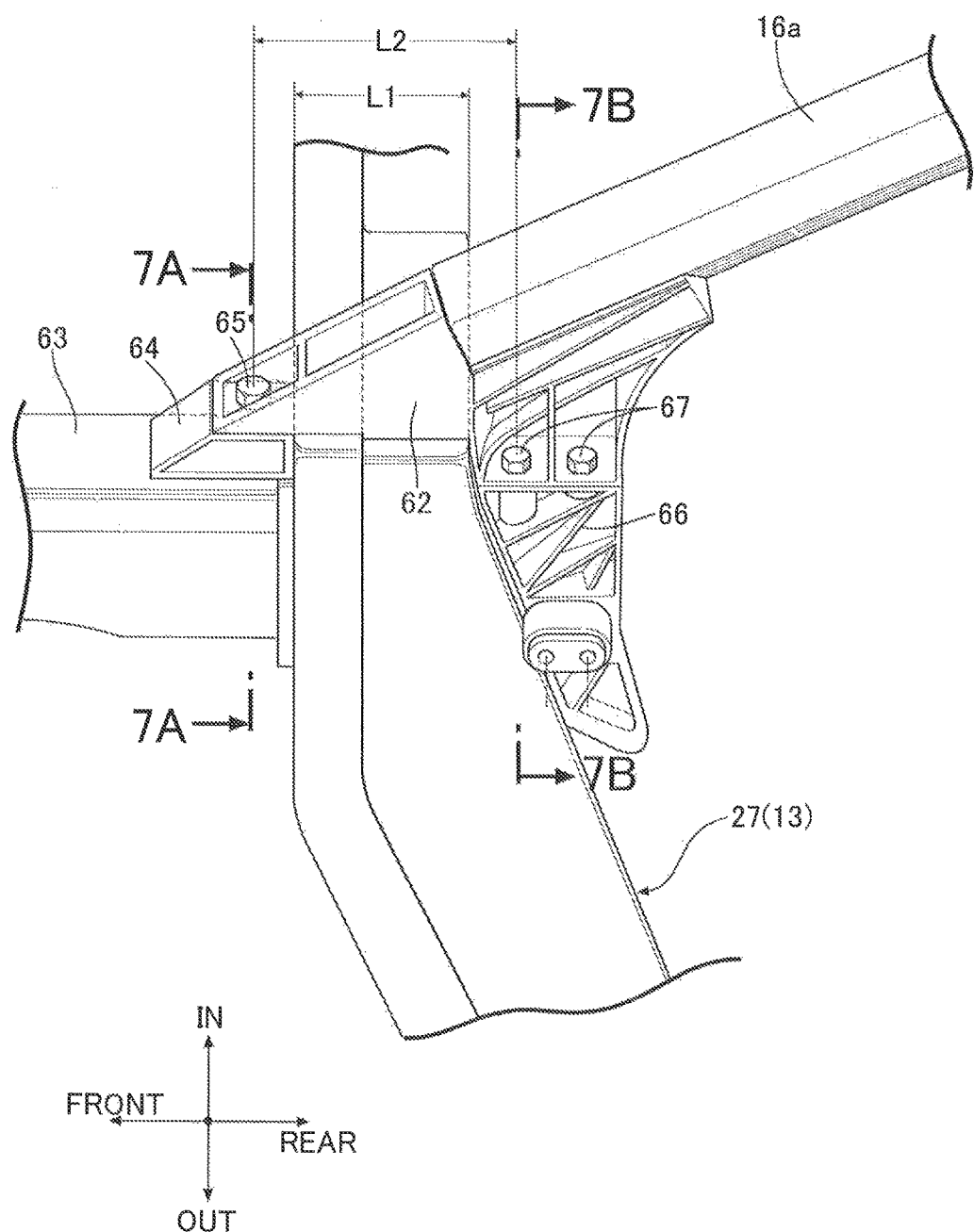
FIG. 6 is an enlarged view of part 6 in FIG. 1.
Figure 7:
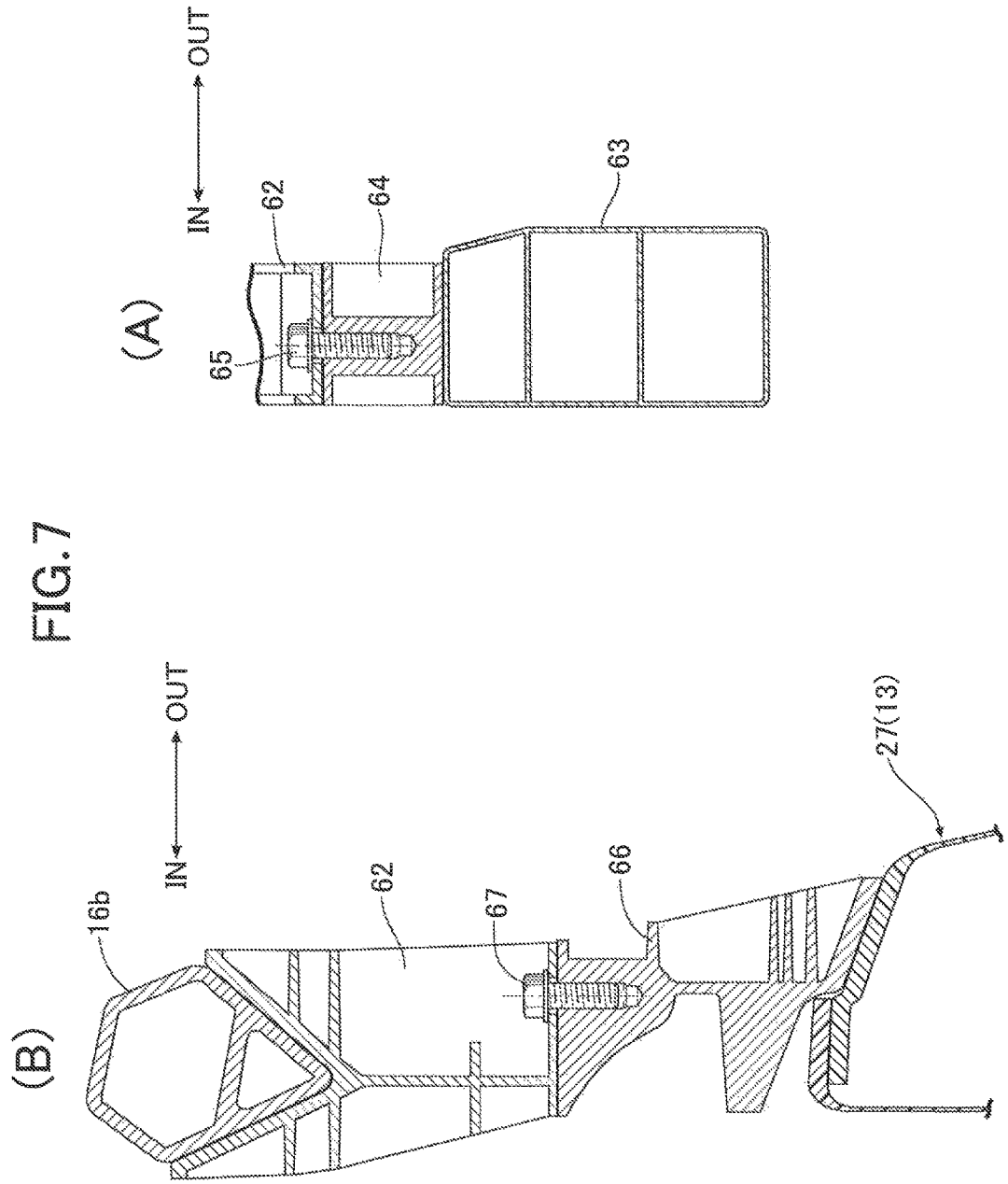
FIG. 7 is a sectional view along line 7A-7A and line 7B-7B in FIG. 6.

As shown in FIG. 6 and FIG. 7, a front metal joint 62, made of an aluminum alloy casting, is welded to the front end of the front member 16a of the roof side rail 16, and this front metal joint 62 is fastened, by means of a front bolt 65, to a metal joint 64, made of an aluminum alloy casting, provided on an upper face of an upper member 63 extending forward from a front face of the dash panel lower 17 and is also fastened, by means of rear bolts 67 and 67, to a metal joint 66, made of an aluminum alloy casting, fixed to the upper face 47 of the front pillar lower 13.

A gap L2 in the fore-and-aft direction between the front and rear bolts 65 and 67 for fastening the front metal joint 62 is set larger than a width L1 in the fore-and-aft direction of the upper end of the front pillar lower 13, and these bolts 65 and 67 are disposed so as to sandwich the upper end of the front pillar lower 13 in the fore-and-aft direction.

Figure 8:
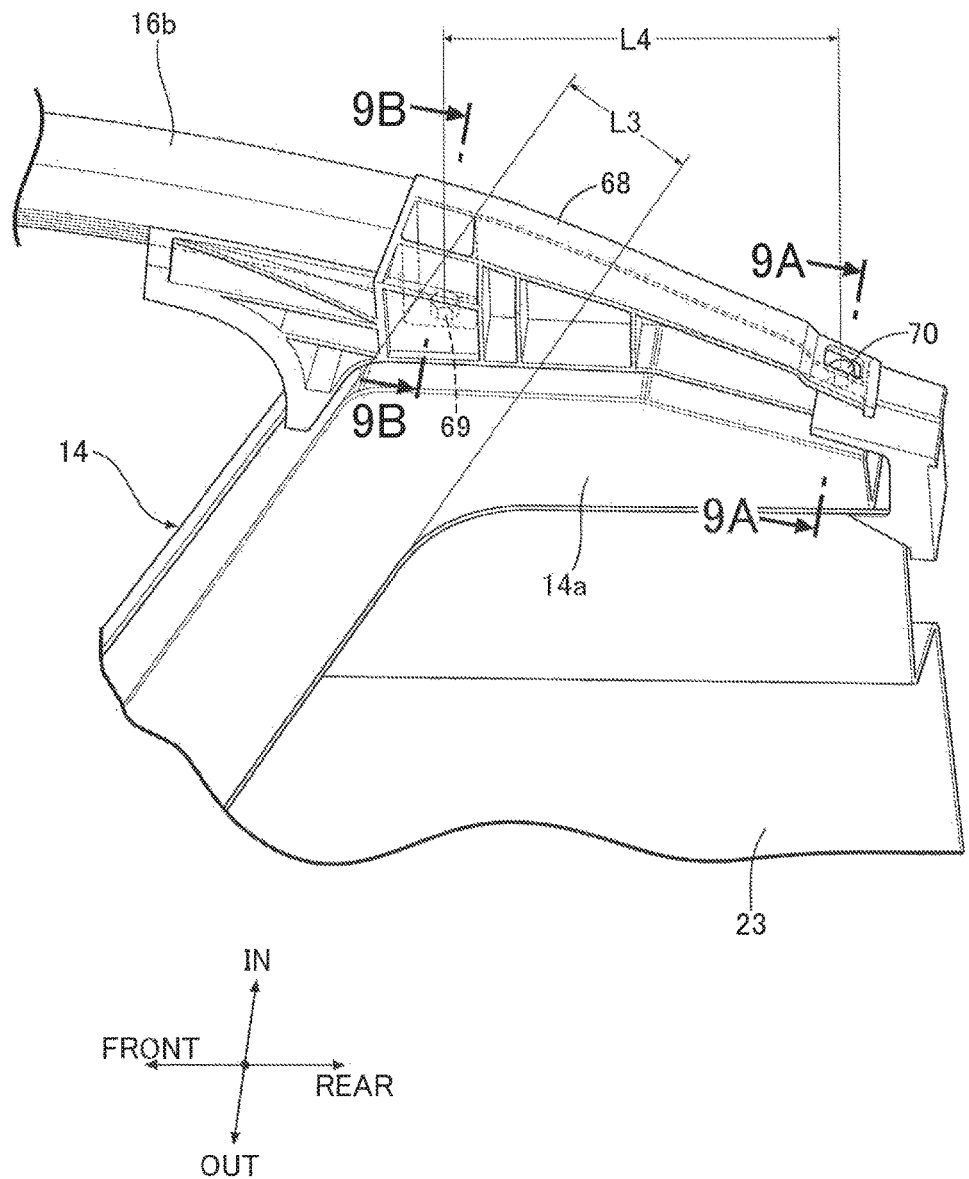
FIG. 8 is an enlarged view of part 8 in FIG. 1.
Figure 9:
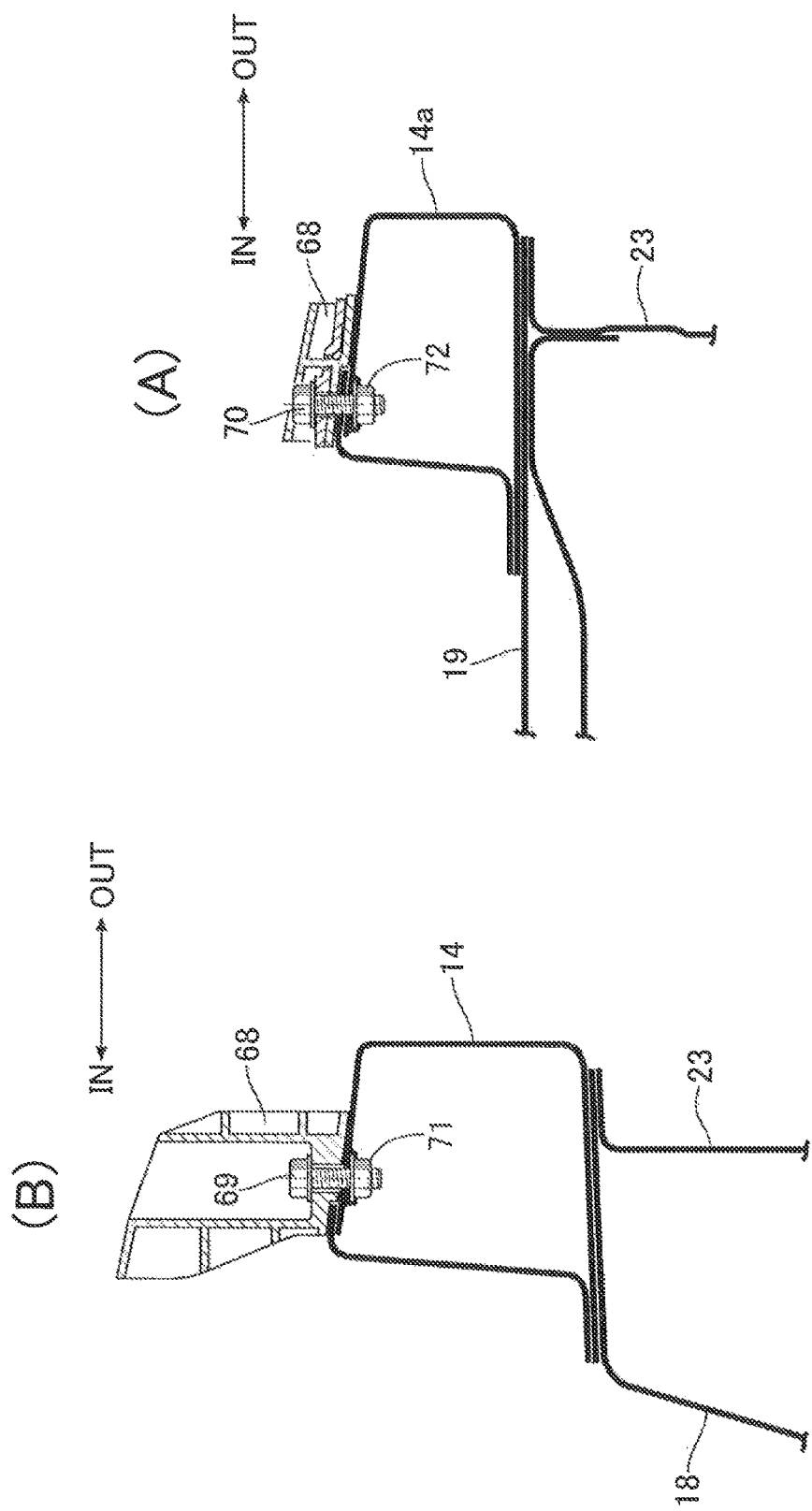
FIG. 9 is a sectional view along line 9A-9A and line 9B-9B in FIG. 8.

As shown in FIG. 8 and FIG. 9, a rear metal joint 68, made of an aluminum alloy casting, is welded to the rear end of the rear member 16b of the roof side rail 16, and this rear metal joint 68 is fastened to an upper wall of an extension portion 14a extending to the rear of the upper end of the rear pillar 14 by means of a front bolt 69, a rear bolt 70, and nuts 71 and 72. A gap L4 in the fore-and-aft direction between the front and rear bolts 69 and 70, which fasten the rear metal joint 68, is set larger than a width L3 in the fore-and-aft direction of the upper end of the rear pillar 14.

The operation of the embodiment of the present invention having the above arrangement is now explained.

In FIG. 4, when the collision load of a side collision is inputted into vehicle width direction outer end parts of the vehicle body floor 11 and the side sill 12, the energy-absorbing members 30 and 30 disposed in the interior of the vehicle body floor 11 and the partition wall plates 36 disposed in the interior of the side sill 12 crumple to thus absorb part of the collision energy, and collision energy that cannot be absorbed there is absorbed by being transmitted to the floor portion 11b of the vehicle body floor 11 via the load-dispersing frame 32.

In FIG. 2, FIG. 3, and FIG. 4, the metal joint 50 for joining the lower end of the roll bar 34 (the lower end of the center pillar 15), which is formed into an inverted U-shape using a CFRP, to an upper face of the side member 27 (an upper face of the side sill 12) is divided into the upper outer joint 51 and the upper inner joint 52 that are fixed to the side sill 12 and support the lower end of the roll bar 34 and the lower joint 53 that is fixed to the vehicle body floor 11. Since, in a state in which the upper outer joint 51 and the upper inner joint 52 abut against the outside face 46, the upper face 47, and the inside face 49 of the side sill 12 from above, and the lower joint 53 abuts against the lower face and the vehicle width direction outer face of the vehicle body floor 11, the flange portion 51d of the lower vehicle width direction outer wall 51c of the upper outer joint 51 and the flange portion 53c of the vehicle width direction outer wall 53b of the lower joint 53 are fastened together by means of the first bolts 54, and the lower vehicle width direction inner wall 52c of the upper inner joint 52 is fastened to the inside face 49 of the side sill 12 by means of the second bolts 56, not only is it possible to strongly join the roll bar 34 to the side sill 12, but it is also possible to easily attach the roll bar 34 to the side sill 12 and detach it therefrom.

Furthermore, since the upper outer joint 51 and the upper inner joint 52 are divided into the inside and the outside in the vehicle width direction and support the lower end of the roll bar 34 while sandwiching it from the inside and the outside in the vehicle width direction, even if there is a variation in the thickness in the vehicle width direction of the lower end of the roll bar 34, it is possible, by adjusting the vehicle width direction gap between the divided upper outer joint 51 and upper inner joint 52, to absorb the variation. Moreover, since the upper outer joint 51, the upper inner joint 52, and the lower joint 53 are made of aluminum alloy castings and the upper outer joint 51 and the lower joint 53 include the reinforcing ribs 51e and 53d extending in the vertical direction, it is possible to enhance the strength of the metal joint 50.

Furthermore, since the center pillar 15 deforms so as to curve inward in the vehicle width direction due to the collision load of a side collision, a compressive load acts on the outer CFRP laminate 59 and a tensile load acts on the inner CFRP laminate 58, but since the compressive load and the tensile load are supported effectively by vertically aligned carbon continuous fibers of the two CFRP laminates 58 and 59, the bending strength thereof can be ensured.

Furthermore, when the center pillar 15 deforms so that its cross section collapses in the vehicle width direction due to the collision load, since the front wall and the rear wall of the center pillar 15 undergo out of plane deformation so that there is expansion in the fore-and-aft direction, if the front wall and the rear wall were formed from a CFRP laminate there is a possibility that they would be easily destroyed. However, in accordance with the present embodiment, due to the two CFRP laminates 58 and 59 of the center pillar 15 being joined by means of the metal plates 60, which are highly resistant to out of plane deformation, it is possible to further enhance the bending strength of the center pillar 15, thus enabling a balance to be achieved between lightness of weight and strength.

Moreover, since the center pillar 15 has a rectangular cross section that is long in the fore-and-aft direction, and the four metal plates 60 are arranged side by side in the fore-and-aft direction, it is possible by reducing the dimensions of the metal plates 60, which try to undergo out of plane deformation due to the collision load of a side collision, to prevent them from deforming, and it is possible by increasing the number of metal plates 60 to further enhance the strength of the center pillar 15.

In particular, since the metal plate 60 has a squared U-shaped cross section that includes at vehicle width direction inner and outer ends the pair of joining flanges 60b and 60b joined to the two CFRP laminates 58 and 59, not only is the strength of the metal plate 60 enhanced by means of the joining flanges 60b and 60b, but it is also possible to strongly join the two CFRP laminates 58 and 59 and the metal plate 60. Moreover, since the metal plate 60 includes the bead 60c extending in the vertical direction, it is possible to suppress out of plane deformation of the metal plate 60 due to the collision load of a side collision more effectively.

Furthermore, since the energy-absorbing member 61 is at a position, above the metal joint 50, on the vehicle width direction outer face of the roll bar 34, when the collision load of a side collision is inputted the energy-absorbing member 61 crumples, thus enabling the collision energy to be absorbed at early stage.

Moreover, since the vehicle body floor 11, the dash panel lower 17, and the rear partition wall 18 form a sandwich structure in which the core 33 is sandwiched between the outer skin 25 and the inner skin 26 (see FIG. 4), and the side member 27 connected to the vehicle body floor 11, dash panel lower 17, and rear partition wall 18 is formed into a U-shape when viewed from the side while integrally including the side sill 12, the front pillar lower 13, and the rear pillar 14 (see FIG. 1 and FIG. 2), it is possible to obtain a light-weight and high-strength lower skeleton 74 by ensuring the longest length for the CFRP carbon continuous fibers.

Figure 10:
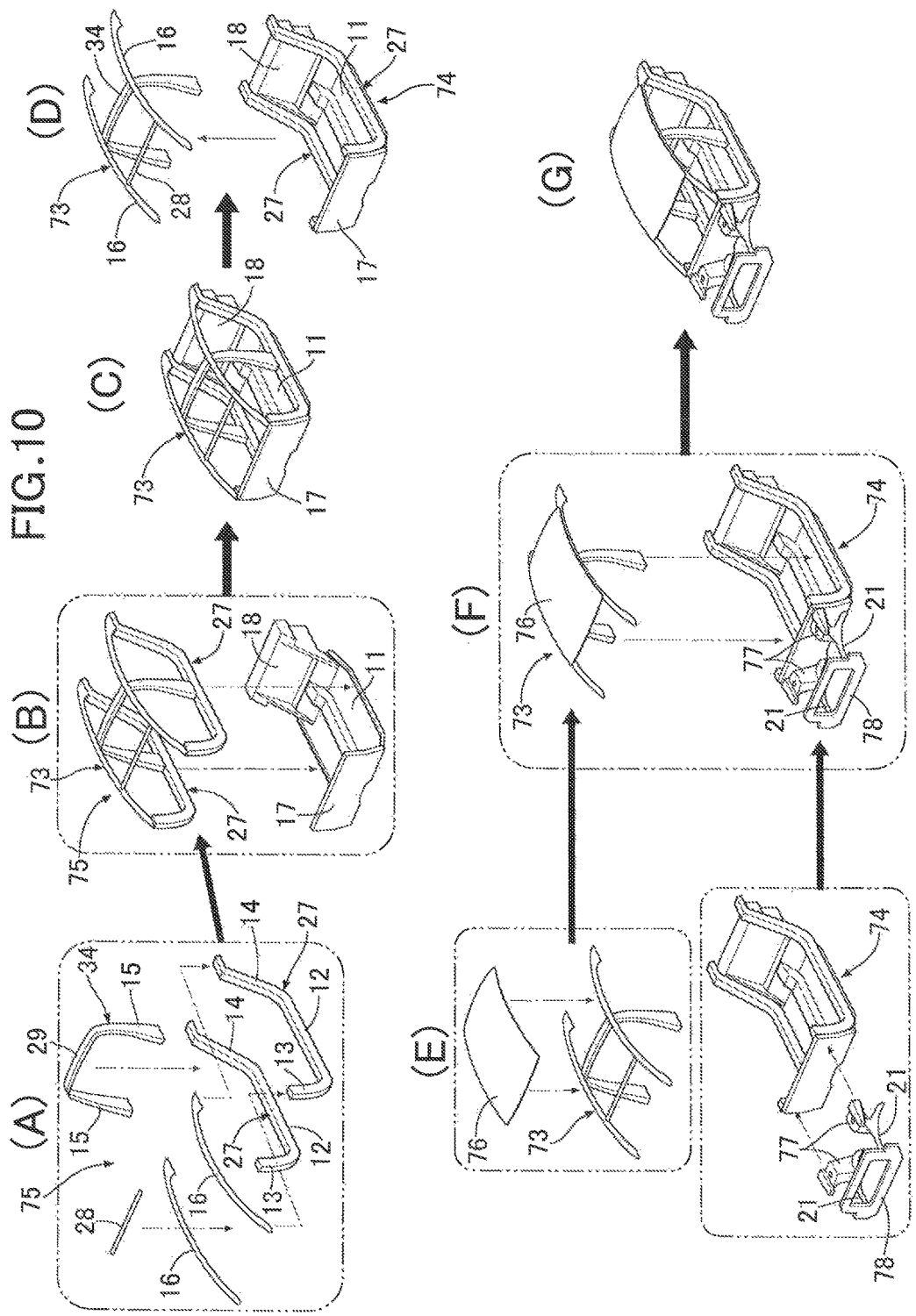
FIG. 10 is a view for explaining steps of assembling the automobile vehicle body.

Furthermore, with regard to the upper skeleton 73 formed by integrating the roll bar 34 and the pair of left and right roof side rails 16 and 16, the lower end of the roll bar 34 is detachably fastened to the side sill 12 by means of the first bolts 54 and the second bolts 56 (see FIG. 4), the front end of the roof side rail 16 is detachably fastened to the upper end of the front pillar lower 13 by means of the front bolt 65 and the rear bolt 67 (see FIG. 6), and the rear end of the roof side rail 16 is detachably fastened to the upper end of the rear pillar 14 by means of the front bolt 69 and the rear bolt 70 (see FIG. 8), and it is therefore possible to simply attach the upper skeleton 73 to the lower skeleton 74 and detach it therefrom, thus enhancing the productivity (see FIG. 10 (D)).

Furthermore, when the front metal joint 62 provided at the front end of the roof side rail 16 is fastened to the upper end of the front pillar lower 13 by means of the front bolt 65 and the rear bolt 67, since the distance L2 between the front bolt 65 and the rear bolt 67 is larger than the width L1 in the fore-and-aft direction of the upper end of the front pillar lower 13 (see FIG. 6), it is possible to strongly support the bending moment acting on the roof side rail 16 by means of the front metal joint 62, thereby enhancing the bending stiffness of the roof side rail 16.

Similarly, when the rear metal joint 68 provided at the rear end of the roof side rail 16 is fastened to the upper end of the rear pillar 14 by means of the front bolt 69 and the rear bolt 70, since the distance L4 between the front bolt 69 and the rear bolt 70 is larger than the width L3 in the fore-and-aft direction of the upper end of the rear pillar 14 (see FIG. 8), it is possible to strongly support the bending moment acting on the roof side rail 16 by means of the rear metal joint 68, thus enhancing the bending stiffness of the roof side rail 16.

Steps of assembling the automobile vehicle body are now explained by reference to FIG. 10.

The pair of left and right roof side rails 16 and 16, the roll bar 34, and the front roof arch 28 are integrally joined to thus assemble the upper skeleton 73, and the pair of left and right side members 27 and 27 are joined to this upper skeleton 73 to thus assemble a subcomponent 75 (see FIG. 10 (A)). The upper skeleton 73 and the side members 27 and 27 are bolted together via the front metal joints 62 and 62 at the front ends of the roof side rails 16 and 16, the metal joints 50 and 50 at the left and right lower ends of the roll bar 34, and the rear metal joints 68 and 68 at the rear ends of the roof side rails 16 and 16.

Subsequently, the side members 27 and 27 of the subcomponent 75 are adhered to an assembly of the vehicle body floor 11, the dash panel lower 17, and the rear partition wall 18 (see FIG. 10 (B)), thus integrating the upper skeleton 73 and the lower skeleton 74 (see FIG. 10 (C)). The lower skeleton 74 is formed from the vehicle body floor 11, the dash panel lower 17, the rear partition wall 18, and the side members 27 and 27.

Subsequently, the bolting together is undone so as to detach the upper skeleton 73 from the lower skeleton 74 (see FIG. 10 (D)), a component such as the roof panel 76 is assembled to the upper skeleton 73, and components such as damper housings 77 and 77, the front side frames 21 and 21, and front bulkhead 78 are assembled to the lower skeleton 74 (see FIG. 10 (E)). The upper skeleton 73 and the lower skeleton 74, to which the components have been assembled, are bolted together again (see FIG. 10 (F)), thus completing an automobile vehicle body (see FIG. 10 (G)).

As described above, not only is it possible, by forming the vehicle body floor 11 and the side members 27 and 27 as separate bodies, to obtain a high-strength CFRP vehicle body structure having an increased cross section for the side members 27 and 27, but it is also possible to easily carry out positioning of the side members 27 and 27 and the vehicle body floor 11 by fastening the upper outer joint 51 and the upper inner joint 52 to the lower joint 53. Moreover, by releasing the fastening of the upper outer joint 51 and the upper inner joint 52 to the lower joint 53, the lower skeleton 74 does not interfere when a component is assembled to the upper skeleton 73, and the upper skeleton 73 does not interfere when a component is assembled to the lower skeleton 74, thus not only improving the productivity, but also enabling joining and separation of the upper skeleton 73 and the lower skeleton 74 to be easily carried out due to them being bolted together.

An embodiment of the present invention is explained above, but the present invention may be modified in a variety of ways as long as the modifications do not depart from the spirit and scope thereof.

For example, in the embodiment the upper joint is divided into the upper outer joint 51 and the upper inner joint 52, but they may be integrated.

The invention claimed is:

1. An automobile vehicle body in which a lower skeleton, formed into a bathtub shape using a carbon fiber-reinforced plastic (CFRP), comprises a vehicle body floor a front wall that rises from a front end of the vehicle body floor, a rear wall that rises from a rear end of the vehicle body floor, and a pair of side members that are connected to upper faces of vehicle width direction opposite side parts of the vehicle body floor, and an upper skeleton, connected to the lower skeleton, comprises a roll bar formed into an inverted U-shaped using a CFRP and having a lower end thereof joined to an upper face of the side member via a metal joint,
wherein the metal joint is divided into an upper joint that is fixed to the side member and supports the lower end of the roll bar and a lower joint that is fixed to the vehicle body floor,
the upper joint comprises an upper wall, a vehicle width direction inner wall and a vehicle width direction outer wall that are fitted to an upper face, an inside face, and an outside face of the side member respectively, and the upper joint is further divided into an inside and an outside in the vehicle width direction and supports the lower end of the roll bar so as to sandwich the lower end from the inside and the outside in the vehicle width direction,
the lower joint comprises a lower wall and a vehicle width direction outer wall that are joined to a lower face and a vehicle width direction outer face of the vehicle body floor respectively, the vehicle width direction outer wall of the upper joint and the vehicle width direction outer wall of the lower joint are fastened by a first bolt, and the vehicle width direction inner wall of the upper joint and the inside face of the side member are fastened by a second bolt.

2. The automobile vehicle body according to claim 1, wherein the metal joint is a casting and comprises a reinforcing rib that extends in a vertical direction.

3. The automobile vehicle body according to claim 1, wherein the roll bar is formed so as to have a closed hollow cross-section by connecting an inner CFRP laminate that forms a lower face and a vehicle width direction inner face and an outer CFRP laminate that forms an upper face and a vehicle width direction outer face by a plurality of metal plates.

4. The automobile vehicle body according to claim 1, comprising an energy-absorbing member at a position above the metal joint of the vehicle width direction outer face of the roll bar.

5. An automobile vehicle body in which a lower skeleton, formed into a bathtub shape using a carbon fiber-reinforced plastic (CFRP), comprises a vehicle body floor a front wall that rises from a front end of the vehicle body floor, a rear wall that rises from a rear end of the vehicle body floor, and a pair of side members that are connected to upper faces of vehicle width direction opposite side parts of the vehicle body floor, and an upper skeleton, connected to the lower skeleton, comprises a roll bar formed into an inverted U-shape using a CFRP and having a lower end thereof joined to an upper face of the side member via a metal joint,
wherein the metal joint is divided into an upper joint that is fixed to the side member and supports the lower end of the roll bar and a lower joint that is fixed to the vehicle body floor,
the upper joint comprises an upper wall, a vehicle width direction inner wall and a vehicle width direction outer wall that are fitted to an upper face, an inside face, and an outside face of the side member respectively,
the lower joint comprises a lower wall and a vehicle width direction outer wall that are joined to a lower face and a vehicle width direction outer face of the vehicle body floor respectively, the vehicle width direction outer wall of the upper joint and the vehicle width direction outer wall of the lower joint are fastened by a first bolt, and the vehicle width direction inner wall of the upper joint and the inside face of the side member are fastened by a second bolt, and
wherein the vehicle body floor, the front wall, and the rear wall comprise a sandwich structure in which a core is sandwiched between an outer skin and an inner skin, and the side member connected to the vehicle body floor, the front wall and the rear wall is formed into a U-shape as seen in a side view while integrally comprising a side sill, a front pillar lower and a rear pillar.

6. The automobile vehicle body according to claim 5, wherein the upper skeleton is formed by connecting a pair of left and right bent parts of the roll bar, which is bent into an inverted U-shape, to respective intermediate parts in a fore-and-aft direction of a pair of left and right roof side rails, which are formed from an aluminum alloy hollow member, by bolting a front end of the roof side rail and an upper end of the front pillar lower together, and by bolting the rear end of the roof side rail and an upper end of the rear pillar together.

7. The automobile vehicle body according to claim 6, wherein the roll bar is fitted into a recess portion formed in the roof side rail, and the roll bar is sandwiched between the recess portion and a fixing member fixed to the roof side rail.

8. The automobile vehicle body according to claim 6, wherein a front metal joint provided at the front end of the roof side rail is fastened to the upper end of the front pillar lower by a front bolt and a rear bolt, and a distance between the front bolt and the rear bolt is larger than a width in a fore-and-aft direction of the upper end of the front pillar lower.

9. The automobile vehicle body according to claim 6, wherein a rear metal joint provided at the rear end of the roof side rail is fastened to the upper end of the rear pillar by a front bolt and a rear bolt, and a distance between the front bolt and the rear bolt is larger than a width in a fore-and-aft direction of the upper end of the rear pillar.

10. A method for manufacturing an automobile vehicle body formed into a bathtub shape using a carbon fiber-reinforced plastic (CFRP), comprises a vehicle body floor a front wall that rises from a front end of the vehicle body floor, a rear wall that rises from a rear end of the vehicle body floor, and a pair of side members that are connected to upper faces of vehicle width direction opposite side parts of the vehicle body floor, and an upper skeleton, connected to the lower skeleton, comprises a roll bar formed into an inverted U-shaped using a CFRP and having a lower end thereof joined to an upper face of the side member via a metal joint,
- wherein the metal joint is divided into an upper joint that is fixed to the side member and supports the lower end of the roll bar and a lower joint that is fixed to the vehicle body floor,
- the upper joint comprises an upper wall, a vehicle width direction inner wall and a vehicle width direction outer wall that are fitted to an upper face, an inside face, and an outside face of the side member respectively,
- the lower joint comprises a lower wall and a vehicle width direction outer wall that are joined to a lower face and a vehicle width direction outer face of the vehicle body floor respectively, the vehicle width direction outer wall of the upper joint and the vehicle width direction outer wall of the lower joint are fastened by a first bolt, and the vehicle width direction inner wall of the upper joint and the inside face of the side member are fastened by a second bolt,
- the method comprising a step of forming a subcomponent by bolting together the upper skeleton and the side member, a step of adhering the side member of the subcomponent to the vehicle body floor, a step of separating the upper skeleton by undoing the bolting together, a step of assembling a component to the upper skeleton and the lower skeleton including the side member, which have been separated, and a step of re-bolting together the upper skeleton and the lower skeleton including the side member, to which the component has been assembled.

* * * * *